US009639330B2

(12) United States Patent
Cao et al.

(10) Patent No.: US 9,639,330 B2
(45) Date of Patent: May 2, 2017

(54) PROGRAMMING INTERFACE

(71) Applicant: Microsoft Corporation, Redmond, WA (US)

(72) Inventors: Xiang Cao, Beijing (CN); Jun Kato, Tokyo (JP); Sean C. McDirmid, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/275,169

(22) PCT Filed: May 14, 2013

(86) PCT No.: PCT/CN2013/075600
§ 371 (c)(1),
(2) Date: May 14, 2014

(87) PCT Pub. No.: WO2014/183261
PCT Pub. Date: Nov. 20, 2014

(65) Prior Publication Data
US 2016/0054981 A1    Feb. 25, 2016

(51) Int. Cl.
*G06F 9/44* (2006.01)
*G06F 11/36* (2006.01)
(Continued)

(52) U.S. Cl.
CPC ............... *G06F 8/33* (2013.01); *G06F 3/048* (2013.01); *G06F 3/0482* (2013.01);
(Continued)

(58) Field of Classification Search
None
See application file for complete search history.

(56) References Cited

U.S. PATENT DOCUMENTS 5,544,318 A * 8/1996 Schmitz .................. G06F 13/14
709/207
6,698,013 B1 * 2/2004 Bertero .................... G06F 8/71
717/101
(Continued)

FOREIGN PATENT DOCUMENTS

KR    1020130020971    3/2013

OTHER PUBLICATIONS

The International Preliminary Report on Patentability mailed Nov. 26, 2015 for PCT application No. PCT/CN2013/075600, 6 pages.
(Continued)

*Primary Examiner* — Jason Mitchell
(74) *Attorney, Agent, or Firm* — Lee & Hayes, PLLC

(57) ABSTRACT

Some examples of a system for providing a visual based programming interface for developing camera-based applications may include a code editor interface, a timeline interface, a canvas interface and/or a program session interface. For instance, the code editor interface may allow a programmer to view and edit source code, the timeline interface may present application data associated with a program session in a frame by frame manner, the canvas interface may allow the programmer to view, interact with, arrange and/or annotate the application data in a visual format, and the program session interface may allow the programmer to choose application data to display in the timeline interface and the canvas interface by selecting between historical program sessions and live program sessions.

18 Claims, 11 Drawing Sheets

(51) Int. Cl.
*G06F 3/048* (2013.01)
*G06F 3/0482* (2013.01)
*G06F 3/0484* (2013.01)

(52) U.S. Cl.
CPC ............ *G06F 3/04842* (2013.01); *G06F 8/34* (2013.01); *G06F 9/44* (2013.01); *G06F 11/3664* (2013.01)

(56) References Cited

U.S. PATENT DOCUMENTS

| | | | |
|---|---|---|---|
| 6,943,826 B1* | 9/2005 | Tatekawa | G01R 31/2825 348/126 |
| 7,095,416 B1* | 8/2006 | Johns | A63F 13/10 345/522 |
| 8,127,247 B2* | 2/2012 | Tremblay | G06K 9/6253 382/149 |
| 2002/0004933 A1* | 1/2002 | Dzoba | G06F 11/362 717/128 |
| 2005/0028107 A1 | 2/2005 | Gomes et al. | |
| 2005/0039170 A1* | 2/2005 | Cifra | G06F 3/0486 717/125 |
| 2005/0216893 A1* | 9/2005 | Horton | G06F 11/3664 717/126 |
| 2005/0278585 A1* | 12/2005 | Spencer | G06F 11/3664 714/46 |
| 2007/0018980 A1* | 1/2007 | Berteig | G06T 17/005 345/426 |
| 2007/0189708 A1* | 8/2007 | Lerman | G11B 27/34 386/280 |
| 2008/0177525 A1* | 7/2008 | Crawford | G06F 11/3664 703/22 |
| 2011/0115792 A1* | 5/2011 | Tamaoki | G06T 15/503 345/426 |
| 2011/0154295 A1 | 6/2011 | Aharoni et al. | |
| 2011/0161934 A1* | 6/2011 | Thomson | G06F 11/3684 717/125 |
| 2012/0210305 A1 | 8/2012 | Bates | |
| 2013/0080951 A1 | 3/2013 | Chuang et al. | |
| 2013/0204707 A1* | 8/2013 | Ptucha | G06Q 30/02 705/14.66 |
| 2015/0082280 A1* | 3/2015 | Betak | G06F 11/3692 717/124 |

OTHER PUBLICATIONS

PCT Search Report and Written Opinion mailed Feb. 27, 2014 for PCT Application No. PCT/CN2013/075600, 10 pages.
"Environment [IDE]. The Processing Environment Includes a Text Editor, a Compiler, and a Display Window. It Enables the Creation of Software within a Carefully Designed Set of Constraints", Published on: Sep. 22, 2012, Available at: http://processing.org/reference/environment/.
Jansen, et al., "ParleVision", Retrieved on: Mar. 21, 2013, Available at: http://micheljansen.org/projects/parlevision.
"The Harmonii Computer Vision Environment", Published on: Nov. 26, 2011, Available at: http://www.kiminkii.com/harmonii.html.
Pope, et al., "Vista: A Software Environment for Computer Vision Research", In IEEE Computer Society Conference on Computer Vision and Pattern Recognition, Jun. 21, 1994, 5 pages.
"Debugging using the IAR C-SPY Debugger", Retrieved on: Mar. 21, 2013, Available at: http://supp.iar.com/FilesPublic/UPDINFO/005832/arm/doc/infocenter/tutor_debugging.ENU.html.
Bendale, et al., "VisionBlocks: A Social Computer Vision Framework", In IEEE Third International Conference on Social Computing Privacy, Security, Risk and Trust, Oct. 9, 2011, 6 pages.
Balzer, R.M., "EXDAMS: Extensible Debugging and Monitoring System", In Proceeding of Spring Joint Computer Conference, Apr. 1969, 42 pages.
Bradski, Gary, "The OpenCV Library", In Dr. Dobb's Journal, vol. 25, Issue 11, Nov. 1, 2000, 7 pages.

Cao, et al., "VisionWand: Interaction Techniques for Large Displays using a Passive Wand Tracked in 3D", In Proceedings of the 16th Annual ACM Symposium on User Interface Software and Technology, Nov. 2, 2003, 10 pages.
Cardenas, et al., "Testing Physical Computing Prototypes through Time-Shifted & Simulated Input Traces", In Proceedings of the 21st Annual ACM Symposium on User Interface Software and Technology, Oct. 19, 2008, 2 pages.
Diaz-Marino, et al., "Cambience: A Video-Driven Sonic Ecology for Media Spaces", In Proceedings of the ACM Conference on Computer Supported Cooperative Work, Nov. 4, 2006, 2 pages.
Edwards, Jonathan, "Subtext: Uncovering the Simplicity of Programming", In Proceedings of the 20th Annual ACM SIGPLAN Conference on Object-oriented Programming, Systems, Languages, and Applications, Oct. 16, 2005, 14 pages.
Fails, et al., "A Design Tool for Camera-Based Interaction", In Proceedings of the SIGCHI Conference on Human Factors in Computing Systems, Apr. 5, 2003, 8 pages.
Geels, et al., "Replay Debugging for Distributed Applications", In Proceedings of the Annual Conference on USENIX Annual Technical Conference, May 30, 2006, 12 pages.
Hager, et al., "X Vision: A Portable Substrate for Real-Time Vision Applications", In Journal of Computer Vision and Image Understanding, vol. 69, Issue 1, Jan. 1998, 15 pages.
Hartmann, et al., "Authoring Sensor-based Interactions by Demonstration with Direct Manipulation and Pattern Recognition", In Proceedings of the SIGCHI Conference on Human Factors in Computing Systems, Apr. 28, 2007, 10 pages.
Hartmann, et al., "Reflective Physical Prototyping through Integrated Design, Test, and Analysis", In Proceedings of the 19th Annual ACM Symposium on User Interface Software and Technology, Oct. 15, 2006, 10 pages.
Hartmann, et al., "Design as Exploration: Creating Interface Alternatives through Parallel Authoring and Runtime Tuning", In Proceedings of the 21st Annual ACM Symposium on User Interface Software and Technology, Oct. 19, 2008, 10 pages.
Klemmer, et al., "Papier-Mache: Toolkit Support for Tangible Input", In Proceedings of the SIGCHI Conference on Human Factors in Computing Systems, Apr. 24, 2004, 8 pages.
Landay, et al., "Interactive Sketching for the Early Stages of User Interface Design", In Proceedings of the SIGCHI Conference on Human Factors in Computing Systems, Jul. 5, 1995, 8 pages.
Maynes-Aminzade, et al., "Techniques for Interactive Audience Participation", In Proceedings of the 4th IEEE International Conference on Multimodal Interfaces, Oct. 14, 2002, 6 pages.
Maynes-Aminzade, et al., "Eyepatch: Prototyping Camera-based Interaction through Examples", In Proceedings of the 20th Annual ACM Symposium on User Interface Software and Technology, Oct. 7, 2007, 10 pages.
"Max is Powerful Software", Retrieved on: Apr. 1, 2013, Available at: http://cycling74.com/products/maxmsp.
McDirmid, Sean, "Living it up with a Live Programming Language", In Proceedings of the 22nd Annual ACM SIGPLAN Conference on Object-oriented Programming Systems and Applications, Oct. 21, 2007, 13 pages.
"Microsoft Visual Studio Visualizers", Retrieved on: Mar. 19, 2013, Available at: http://msdn.microsoft.com/en-us/library/zayyhzts.aspx.
Moher, Thomas G., "PROVIDE: A Process Visualization and Debugging Environment", In Journal of IEEE Transactions on Software Engineering, vol. 14, Issue 6, Jun. 1988, 9 pages.
Newman, et al., "Bringing the Field into the Lab: Supporting Capture and Replay of Contextual Data for Design", In Proceedings of the 23nd Annual ACM Symposium on User Interface Software and Technology, Oct. 3, 2009, 4 pages.
Patel, et al., "Gestalt: Integrated Support for Implementation and Analysis in Machine Learning", In Proceedings of the 23nd Annual ACM Symposium on User Interface Software and Technology, Oct. 3, 2010, 10 pages.
Pothier, et al., "Scalable Omniscient Debugging", In Proceedings of the 22nd Annual ACM SIGPLAN Conference on Object-oriented Programming Systems and Applications, Oct. 21, 2007, 17 pages.

(56) References Cited

OTHER PUBLICATIONS

"SharpDevelop", Retrieved on: Mar. 19, 2013, Available at: http://www.icsharpcode.net/opensource/sd/.

Visan, et al., "URDB: A Universal Reversible Debugger Based on Decomposing Debugging Histories", In Proceedings of the 6th Workshop on Programming Languages and Operating Systems, Oct. 23, 2011, 5 pages.

Wang, et al., "Face Tracking as an Augmented Input in Video Games: Enhancing Presence, Role-playing and Control", In Proceedings of the SIGCHI Conference on Human Factors in Computing Systems, Apr. 22, 2006, 10 pages.

Wilson, Andrew D., "PlayAnywhere: A Compact Interactive Tabletop Projection-Vision System", In Proceedings of the 18th Annual ACM Symposium on User Interface Software and Technology, Oct. 23, 2005, 10 pages.

Zeller, et al., "DDD—A Free Graphical Front-End for UNIX Debuggers", In Newsletter of ACM SIGPLAN Notices, vol. 31, Issue 1, Jan. 1996, 6 pages.

Kato, et al., "DejaVu: Integrated Support for Developing Interactive Camera-Based Programs", In Proceedings of the 25th Annual ACM Symposium on User Interface Software and Technology, Oct. 7, 2012, 8 pages.

Chang, et al., "GUI Testing Using Computer Vision", In Proceedings of the SIGCHI Conference on Human Factors in Computing Systems, Apr. 10, 2010, 10 pages.

Dixon, et al., "Prefab: Implementing Advanced Behaviors Using Pixel-Based Reverse Engineering of Interface Structure", In Proceedings of the SIGCHI Conference on Human Factors in Computing Systems, Apr. 10, 2010, 10 pages.

Klinker, Gudrun, "VDI: A Visual Debugging Interface for Image Interpretation and Other Applications", In Proceeding of 2nd Eurographics WS on Visualization in Scientific Computing, Mar. 7, 1991, 42 pages.

Yeh, et al., "Sikuli: Using GUI Screenshots for Search and Automation", In Proceedings of the 22nd Annual ACM Symposium on User Interface Software and Technology, Oct. 4, 2009, 10 pages.

Segen et al., "GestureVR: Vision-Based 3D Hand Intereface for Spatial Interaction", ACM Multimedia, 1998, pp. 455-464.

\* cited by examiner

PROGRAMMING INTERFACE

RELATED APPLICATIONS

The present application is a non-provisional of and claims priority under 35 U.S.C. §119 and §120 to PCT/CN2013/075600 filed on May 14, 2013 and entitled "PROGRAMMING INTERFACE," which has an earliest priority date of May 14, 2013 and is incorporated by reference in its entirety.

BACKGROUND

With the increased popularity of interactive camera-based computing systems, the number of camera-based programs being written has increased dramatically. However, developing such programs with conventional integrated development environments (IDEs) poses unique challenges. For example, in many conventional IDEs the programmer is presented with discrete textual data values rather than continuously visual representations that more accurately reflect the interactive computer vision data relied on in camera-based computing. Moreover, replicating inputs for debugging in a frame-based loop architecture typically associated with camera-based programming is difficult.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations herein provide implementations for camera-based programming interfaces. For instance, a canvas may be provided to allow the programmer to interact, annotate and arrange variables in an arbitrary layout. In other cases, a timeline may be provided to allow the user to monitor and visualize application data over multiple frames of execution.

In some particular implementations, the canvas and timeline may be provided together with a code editor to generate a combined interface. In some examples, the combined interface allows the programmer to drag and drop variables between the code editor, the canvas and the timeline to more easily monitor changes in data related to various aspects of the application. In one particular example, programmers using the combined interface are able to revise the source code, rerun the application using previously recorded program sessions and monitor application data related to the execution.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Figure 1:
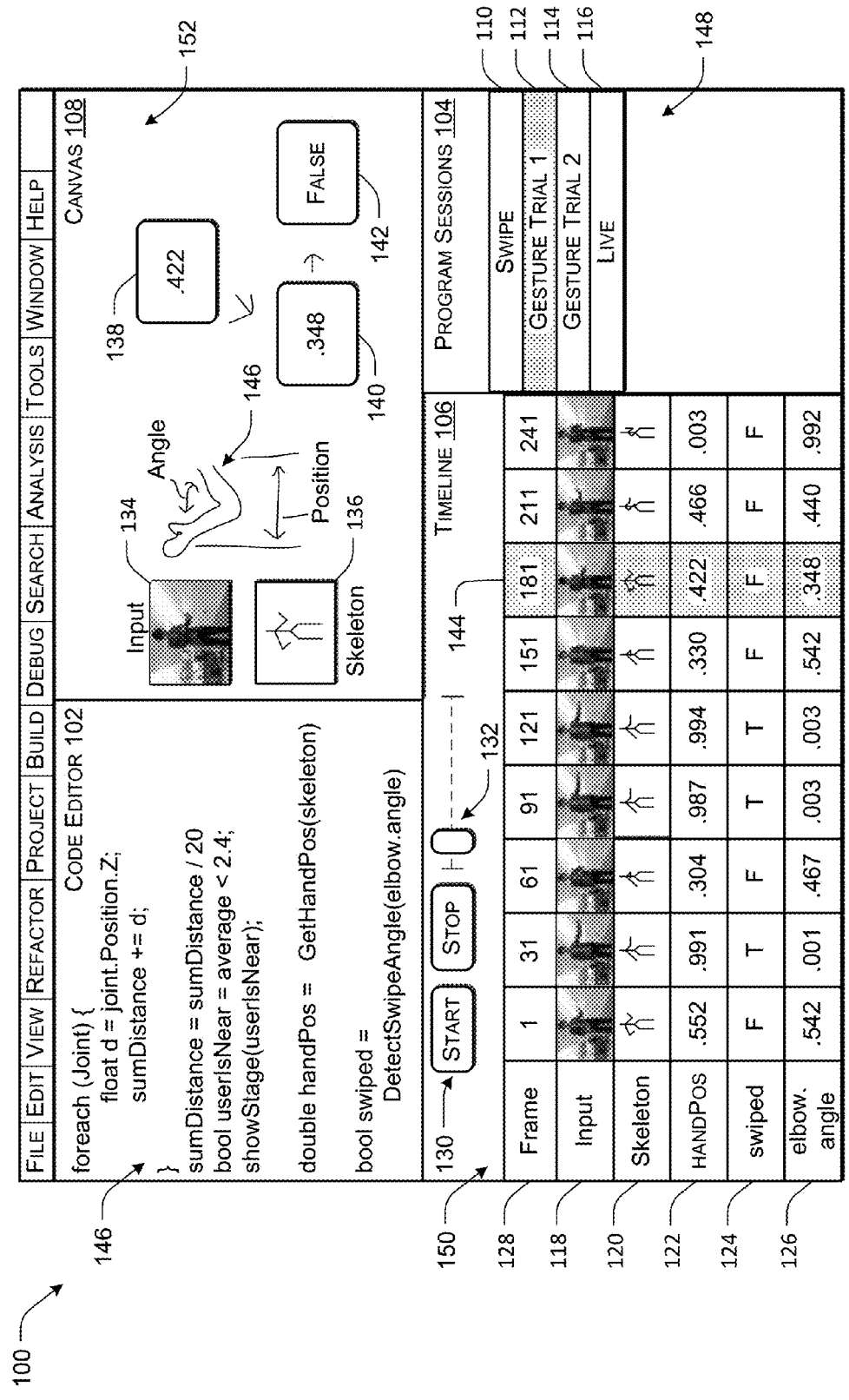
FIG. 1 is an illustrative example of a programming interface for developing camera-based applications according to some implementations.

The disclosed techniques describe implementations of camera-based programming interfaces. Various implementations herein provide a programming interface for developing and debugging camera-based applications. The programming interface has multiple user interfaces to allow the user to monitor, interact, arrange and annotate application data before, during and/or after runtime. For instance, the programming interface may include a code editor, a timeline, a canvas and/or a program session interface for presenting application data and input data to the programmer in a visual or pictographic format.

As used herein a "camera-based application" is an application that processes visual or pictorgaphic information captured by a camera or other imaging technology in a frame by frame manner to detect and respond to natural user inputs. Generally, the camera-based applications include a natural user interface (NUI) that enables a user to interact with a device in a "natural" manner, free from artificial constraints imposed by input devices such as mice, keyboards, remote controls, and the like. For example, a camera-based application utilizing a NUI may include motion or gesture recognition both on screen and adjacent to the screen, air gestures, head and eye tracking, vision, touch, gestures, and machine intelligence. Some applications utilizing a NUI also include speech, touch and stylus recognition, as well as, voice and speech machine intelligence.

The code editor is a source code editing interface from which the programmer may edit the application and/or view the source code directly. The code editor may include various functionality relevant to code development processes, such as syntax highlighting, auto-complete features and/or bracket matching. The code editor may also provide convenient features to compile the application, interpret the application or debug the application.

The timeline interface presents the programmer with application data associated with a particular program session. For example, the programmer may utilize the timeline to display application data captured in historical program sessions. In another example, the programmer may utilize the timeline to present application data related to a live or active program session. The programmer may wish to review past sessions as the programmer is updating or editing code, while at other times the programmer may wish to start a new session and record live camera inputs, such as to test a new module or aspect.

As used herein a "program session" may include data associated with an instance of the application given a particular camera-based input. For example, a program session may include a frame by frame record of the values of one or more variables associated with the application executing on given camera-based input data. Characteristically, a program session includes a recording of the camera-based input, which may be used to rerun or execute the application during the debugging process, such that the programmer may minimize variability in the input data. In one particular implementation, a program session is configured to update or refresh the values of the one or more variables in the background as the programmer makes changes to the source code in the code editor interface.

In some cases, the timeline is able to present programming sessions in multiple data streams or rows, each of which corresponds to a particular variable associated with the application. In some implementations, the timeline is configured to display the data streams in a frame by frame manner. Thus, the programmer is able to view changes in variables corresponding to each data stream, as each frame of a camera-based input is processed by the application. In one particular example, the timeline may present the variables in a visual or pictographic format, such that the programmer is able to watch the live or recorded camera-based input during runtime. For instance, the timeline may present a variable related to a video input as a series of images, a variable related to a numerical value as a graph and/or a variable related to an array as a multi-dimensional table.

The canvas is an interactive interface that allows the programmer to continuously monitor any number of variables during or after runtime in an arbitrary visual layout. The canvas is configured to display an instance associated with each variable added to the canvas by the programmer. Each of the instances present to the programmer with values of the associated variable. For example, the programmer may select variables from either the code editor or the timeline and drop the variables as an instance at any location within the canvas. The programmer may then freely reposition the instances within the canvas and/or remove the instances at any time to arrange the instances in any layout that the programmer desires. In some implementations, the programmer may add notes or annotations to the canvas in addition to instances of the variables. For example, the programmer may include notes related to the expected value of a variable or diagram out a flow chart, such that the programmer is more easily able to follow and understand value changes in particular variables.

The instances in the canvas are displayed in a visual or pictographic format and are updated on a frame by frame basis as the application is executed. Therefore, during execution, the instances within the canvas display the current frame or current value of the variable. For example, if the variable is related to the camera-based input, the instance presents the image of the frame being processed. Likewise, if the variable is a double, the instance may display the current numerical value or a graphical representation of the value. In one particular example, the programmer is able to drag and drop multiple instances of the same variable from the code editor into the canvas to monitor changes in the value of the variable during the processing of a single frame.

The program sessions interface presents the programmer with a list of available program sessions including both historic sessions and live sessions. By providing the programmer with the historic sessions, the programmer may reuse or rerun the application using the same input data. Thus, the programmer is more easily able to detect bugs and to track expected results over time, as the camera-based input data remains constant. The program sessions interface also allows the programmer to start live program sessions using live cameras to capture the input data.

In some implementations, the programming interface includes various combinations of the code editor, the timeline, the canvas and the program session interface to further aid the programmer in developing camera-based applications. For example, in one implementation, the canvas may be utilized in combination with the code editor and the timeline, such that the programmer is able to drag and drop or select variable from the code editor and display the variables in either or both of the timeline and the canvas. Thus, the programmer is able to visualize the application data in the timeline in a frame by frame manner and in the canvas in an arbitrary layout with annotations. In this implementation, the programming interface may also be configured such that the programmer is able to drag and drop or select data streams in the timeline and add the data streams as instances in the canvas or drag and drop or select instances in the canvas and add the instances as data streams in the timeline.

FIG. 1 is an illustrative example of a programming interface 100 for developing camera-based applications according to some implementations. The programming interface 100 includes a code editor 102, a program session interface 104, a timeline 106 and a canvas 108 for providing an IDE for developing camera-based applications in a visual frame by frame format. The program interface 100 is configured to aid the programmer in debugging and testing the camera-based applications by allowing the programmer to track, annotate and visualize application data before, during and after runtime events.

The code editor 102 is a source code editing interface from which the programmer may edit the application and/or view the code directly. The code editor may include various functionality relevant to code development processes, such as syntax highlighting, auto-complete features and/or bracket matching. For instance, in the illustrated example, a code segment "foreach (Joint {float d=joint.Position.Z; sum-Distnace+=d;} . . . " is currently displayed in the code editor 102. The code editor 102 is configured to allow the programmer to directly edit the source code.

The program sessions interface 104 presents the programmer with a list of available program sessions, such as program sessions 110, 112, 114 and 116. The program sessions presented to the programmer in the program sessions interface 104 include historic program sessions, such as program sessions 110, 112 and 114, and the option to activate a live program session 116. In one example, the programmer may execute the application using one or more of the historic program sessions 110-114 to debug the application using the same input data. In one particular implementation, the historic program sessions 110-114 update or refresh the application data in the background while the programmer edits the source code using the code editor 102.

Generally, the timeline 106 presents the application data associated with a particular program session to the programmer in a frame by frame manner. For instance, in the illustrated example, the programmer has selected and is viewing the program session 112, "Gesture Trial 1," and the timeline 106 is presenting the programmer with programming data related to the program session 112.

The timeline 106 presents the application data in multiple data streams (or rows), such as data streams 118, 120, 122, 124 and 126. Each of the data streams 118-126 correspond to a particular variable that the programmer wishes to track or visualize. For example, the programmer may select variables displayed in the code editor 102 and drag and drop or add the variables as data streams into the timeline. In this way, the programmer is able to customize which variables are presented. In other implementations, the timeline 106 may display a data stream corresponding to each variable in the application.

Each of the data streams 118-126 display values related to the corresponding variable as the application processes each frame of the camera-based input, such that the program may monitor changes in the value after each frame is processed. In the illustrated example, the timeline 106 is presenting data streams 118-126 corresponding to the application data of program session 112, "Gesture Trial 1," which includes an individual making multiple swiping gestures. In the illustrated example, the data stream 118 corresponds to the camera-based input, the data stream 120 corresponds to the variable "skeleton" derived from the camera-based input, the data stream 122 corresponds to the hand position of the individual as determined by the double "handPos," the data stream 124 corresponds to Boolean "swiped" and the data stream 126 corresponds to the elbow angle of the individual as determined by the double "elbow.angle."

The timeline 106 also provides the programmer with a frame number indication 128 corresponding to the frames currently presented in the timeline 106. For instance, in the illustrated example, the timeline 106 is displaying every 30 frames starting at frame 1 to frame 241. Therefore, the image shown, as frame 31, of the data stream 118 is an image corresponding to the 31 frame of the camera-based input processed by the application. The number of frames skipped and/or presented to the programmer within the timeline 106 is variable and may be configured by the programmer. For instance, the programmer may configure the timeline 106 to display every frame of the program session 112.

In one particular implementation, the number of frames skipped in the timeline 106 corresponds to the speed at which the programmer is running/viewing the program session. For example, if the programmer is viewing the program session in real time the timeline 106 may present every 100 frames but if the programmer is viewing the program session at $1/100$ real time the timeline 106 may present every frame in the timeline 106. In other examples, the timeline 106 may display every 100 frames during execution but the programmer may review the program session 112 one frame at a time after the application has finished processing the camera-based input. In one particular example, the programmer may be interested in reviewing a specific set of frames and the programmer may cause the timeline 106 to present only the specific set of frames.

The timeline 106 also includes a highlight 144, which indicates the current frame of interest. Thus, in the illustrative example, the highlight 144 indicates that the programmer is currently viewing "frame number 181." In the illustrated example, the data streams 118-126 include values for frames following the highlight 144. In this example, the values exist as the programmer is viewing "frame 181" in a historic or previously recorded program session 112 and the values shown correspond to the values obtained when the program session 112 was recorded.

In some implementations, the stored application data associated with a program session may be updated during each time the associated camera-based input is processed and/or the programming interface 100 may be configured to generate a new program session for each time that the application processes the associated camera-based input data. For instance, in the illustrated example, the programming interface 100 may generate a program session, "Gesture Trial 3," and present the new program session in the program sessions interface 104 after processing the camera-based input of the program session 112 for a second time.

The timeline 106 may also include controls, generally indicated by 130, which allow the programmer to start or stop execution, and/or control the speed of execution. For example, the programmer may desire the application to process the input data one frame at a time and/or 100 frames at a time. In this example, the programmer may control the speed of execution by adjusting the slider bar generally indicated by 132, which in turn may adjust the frames presented in the timeline 106.

The canvas 108 is an interactive interface that allows the programmer to continuously monitor any number of variables during runtime in an arbitrary visual layout. For example, the programmer may drag and drop variables from the code editor 102 to any location within the canvas 108 to generate an instance of the variable. The instances in the canvas 108 present the value of the associated variable to the programmer in a visual or pictographic format (e.g., as images, graphs, and/or multi-dimensional arrays). In some implementations, the programmer may generate an instance by dragging and dropping data streams from the timeline 106 into the canvas 108.

During runtime, the canvas 108 displays the current value of the variable. For example, if the input is a live camera feed then the values displayed in the canvas 108 represent the latest frame to be captured and processed. In the illustrated example, the programmer has added instances 134, 136, 138, 140 and 142, which respectively correspond to the variables 118-126. The values displayed by the instances 134-142 correspond to the values of the variables 118-126 at the current frame of interest, indicated by highlight 144.

Each of the instances 134-142 in the canvas 108 are configured to maintain a record of the exact position of where the instance 134-142 was dragged from within the code editor 102 and to show a value just after the execution of the code at that position. Thus, in some cases, the programmer may add more than one instance of the same variable to the canvas 108 to monitor the changes of the variable during the processing of a single frame.

The canvas 108 also allows the programmer to freely reposition the instances 134-142 within the canvas 108 and/or remove one or more of the instances 134-142 from the canvas 108. For example, the programmer may arrange the instances 134-142 on the canvas 108 to create a flow diagram or table, such that the programmer is able to follow the processing of the input data by the application in an arbitrary visual layout.

The programmer is also able to add notes or annotations to the canvas around the instances 134-142. For example, the programmer may include notes related to the expected value of a variable and/or drawings corresponding to expected images or features. For instance, in the illustrated example, the programmer has drawn an arm with an expected angle and position, generally indicated by annotation 146, which the programmer may compare visually, frame by frame, with the instance 134 of the data stream 118 as the application is processed.

Generally, the programming interface described above, is generated by one or more processors of a computing device executing a graphical user interface (GUI) module. The GUI module when executed causes a GUI representing the programming interface to be presented on a display of the computing device. The GUI may include as many as four separate areas presented concurrently with each other. In the illustrated example, the GUI includes a first area 146 for presenting the code editor 102, a second area 148 for presenting the program sessions interface 104, a third area 150 for presenting the timeline 106 and a fourth area 152 for presenting the canvas 108. However, in some implementations, the GUI module may cause less than all of the areas 146-152 to be presented on the display. For example, the programming interface may be configured to display the timeline 106 and the canvas 108 but not the code editor 102 and the program sessions 104 while the application is executing, such that the programmer is able to utilize and view more instances on a larger canvas 108.

Figure 2:
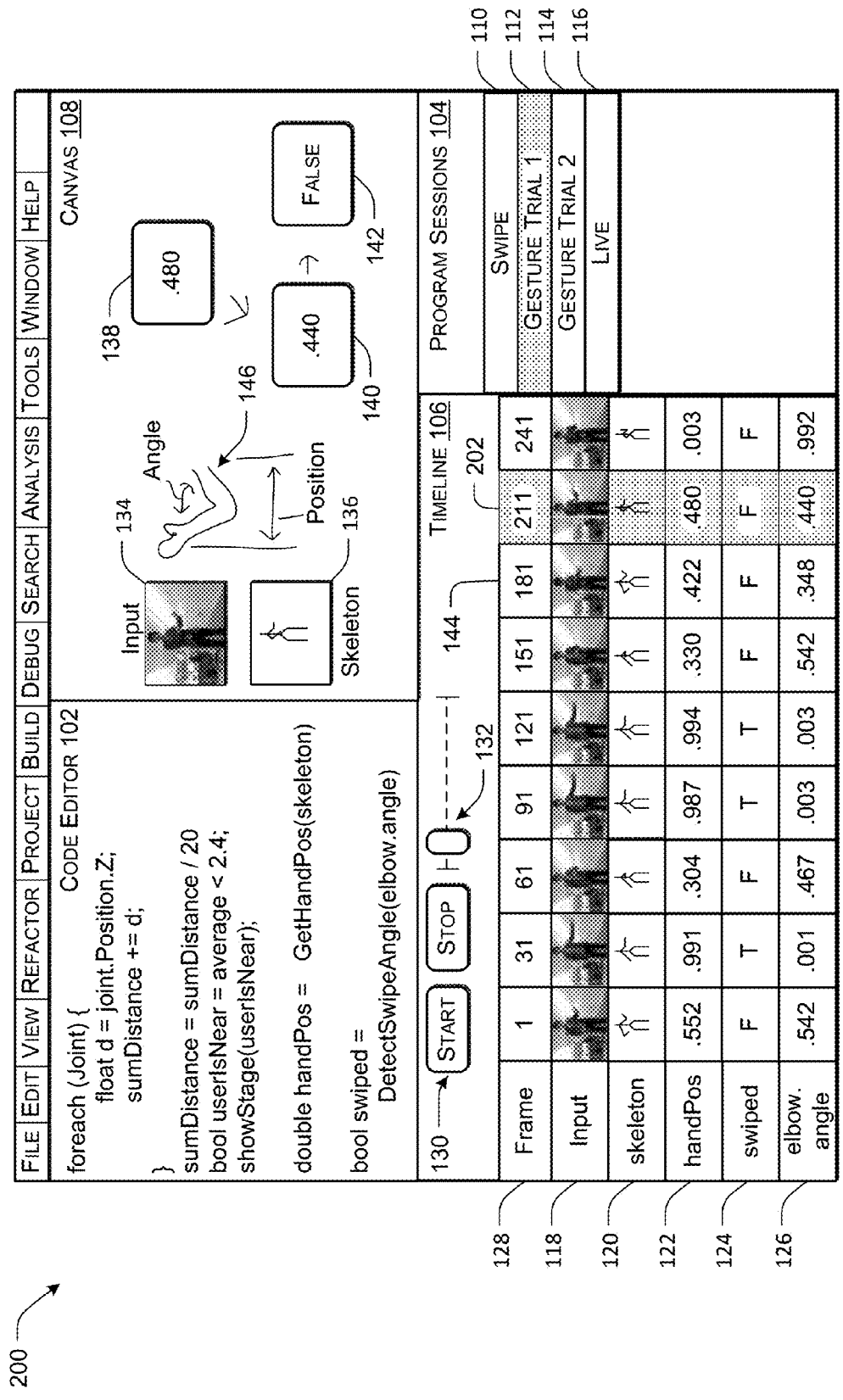
FIG. 2 is another illustrative example of a programming interface for developing camera-based applications according to some implementations.

FIG. 2 is another illustrative example of a programming interface 200 for developing camera-based applications according to some implementations. The program interface 200 includes the code editor 102, the program sessions interface 104, the timeline 106 and the canvas 108 as described above with respect to FIG. 1. The program sessions interface 104 presents the program sessions 110, 112, 114 and 116 to the programmer for selection and viewing using the timeline 106 and the canvas 108. The timeline 106 is illustrated as presenting data streams 118, 120, 122, 124 and 126. The timeline 106 also includes controls, generally indicated by 130 and 132, which allow the programmer to start execution, stop execution and/or control the speed of execution. The canvas 108 is illustrated as presetting instances 134, 136, 138, 140 and 142 and annotation 146 as described in FIG. 1.

In the illustrative example, the programmer continues to view the program session 112, "Gesture Trial 1," however; the programmer has moved the application forward by 30 frames from the highlight 144 to the current frame of interest at highlight 202. As can be seen from the illustrated example, the instances 134-142 in the canvas 108 have updated to display the values associated with the current frame, as indicated by the highlight 202. For example, the instance 138 corresponding to the variable "handPos" now displays the value 0.480 and the instance 140 corresponding to the variable "elbow.angle" has updated from 0.348 in FIG. 1 to 0.440.

In one implementation, the program interface 200 is configured to update or refresh the values in the data streams 118-126 in the background in response to detecting revisions of the application. In the illustrated example, the data streams 118-126 have also updated to reflect edits in the source code made by the programmer. For instance, in FIG. 1 the value of data stream 122 as indicated by the highlight 202 was 0.466 but now displays a value of 0.480. The change in value reflects a change that the programmer made in how the variable "handPos" is calculated. In some implementations, the programming interface 200 may generate and provide a new program session, such as "Gesture Trial 3," in response to detecting the revisions. In this way, the programmer is able to collect program sessions and to compare variable values between program sessions.

Figure 3:
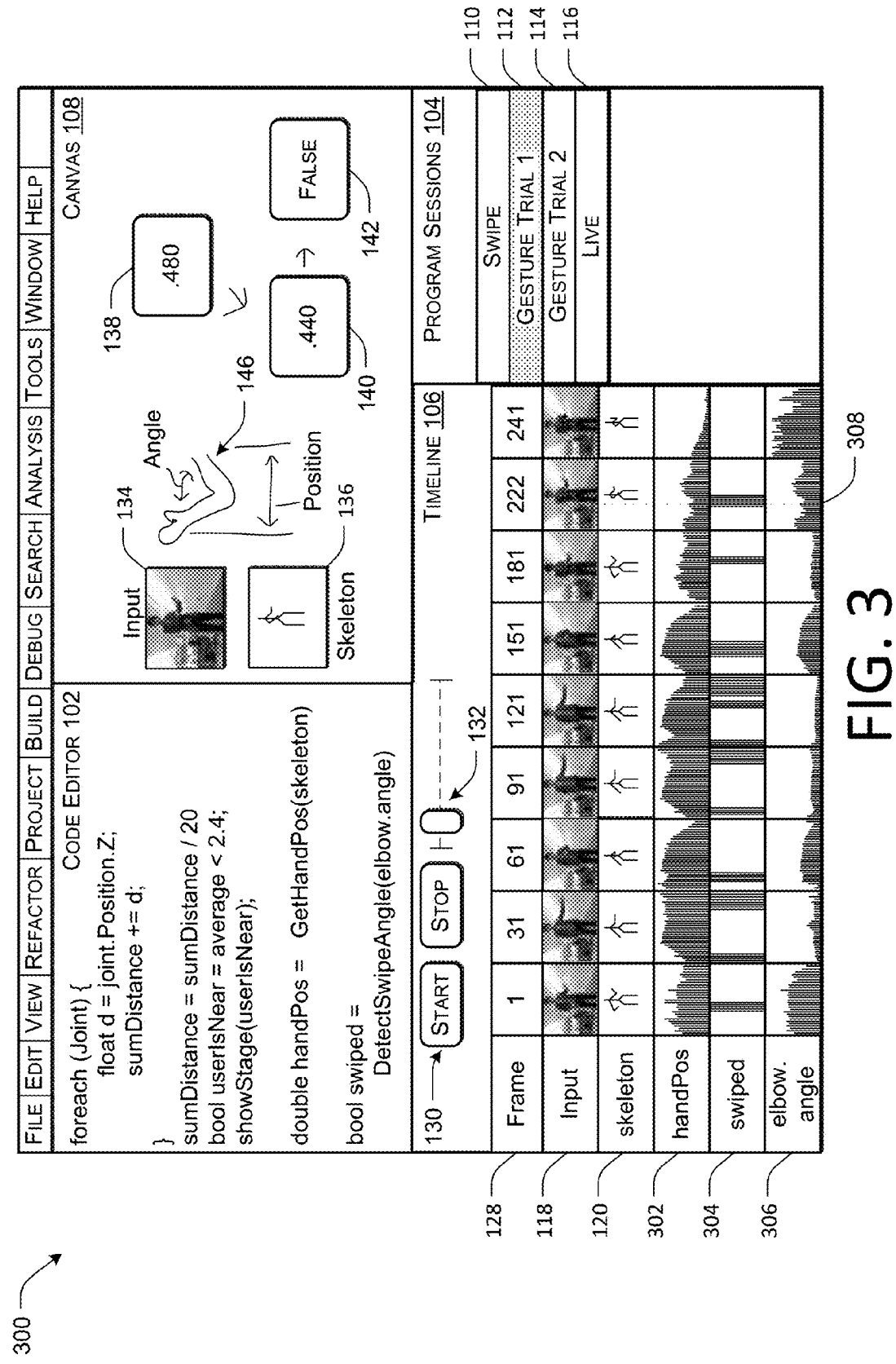
FIG. 3 is another illustrative example of a programming interface for developing camera-based applications according to some implementations.

FIG. 3 is another illustrative example of a programming interface 300 for developing camera-based applications according to some implementations. The program interface 300 is also illustrated as including the code editor 102, the program sessions interface 104, the timeline 106 and the canvas 108 as described above with respect to FIGS. 1 and 2. The program sessions interface 104 presents the program sessions 110, 112, 114 and 116 to the programmer for selection and viewing using the timeline 106 and the canvas 108. The canvas 108 is illustrated as presenting instances 134, 136, 138, 140 and 142 and annotation 146 as described in FIGS. 1 and 2. The timeline 106 is illustrated as presenting data streams 118 and 120 as described in FIGS. 1 and 2 but is also illustrated as presenting data streams 302, 304 and 306. The timeline 106 also includes controls, generally indicated by 130 and 132, which allow the programmer to start execution, stop execution and/or control the speed of execution.

In the illustrated implementation, the data streams 302, 304 and 306 provide a graphical representation of the corresponding variables in lieu of the numerical or textual values described in FIGS. 1 and 2. For example, the data streams 302 and 306 representing numerical variables "handPos" and "eblow.angle," respectively, and are illustrated as a series of bars. The height of each of the bars represents the value of the variable for one frame of the camera-based input processed by the application. Similarly, the data stream 304, which represents the Boolean variable "swiped," is represented by a full bar, indicating a value of true, or by an empty bar, indicating a value of false. In this way, the programmer is able to view the values of numerical and Boolean variables in a visual manner.

The programming interface 300 also includes a highlight 308 indicating the current frame of interest. In this example, the highlight 308 is a vertical bar running through each of the data streams 118, 120, 302, 304 and 306; such that the programmer is able to determine the exact frame the programmer is viewing. The frame indicator 128 also displays a value of "222" representing the highlight 308. Thus, as the application processes each frame the highlight 308 moves to the right by one bar and the value shown above in the frame indicator 128 increases by one.

It should be noted, that the instances 138, 140 and 142 representing the variables "handPos," "swiped" and "elbow.angle" still provide a numerical or textual value, such that the programmer is able to monitor the exact value of the variables as the frames are processed. In some implementations, the instances 138-142 may provide a visual indication similar to that shown in data streams 302-306. For example, the instance 138 may display 30 frames and include a highlight to indicate the currently frame of interest.

Figure 4:
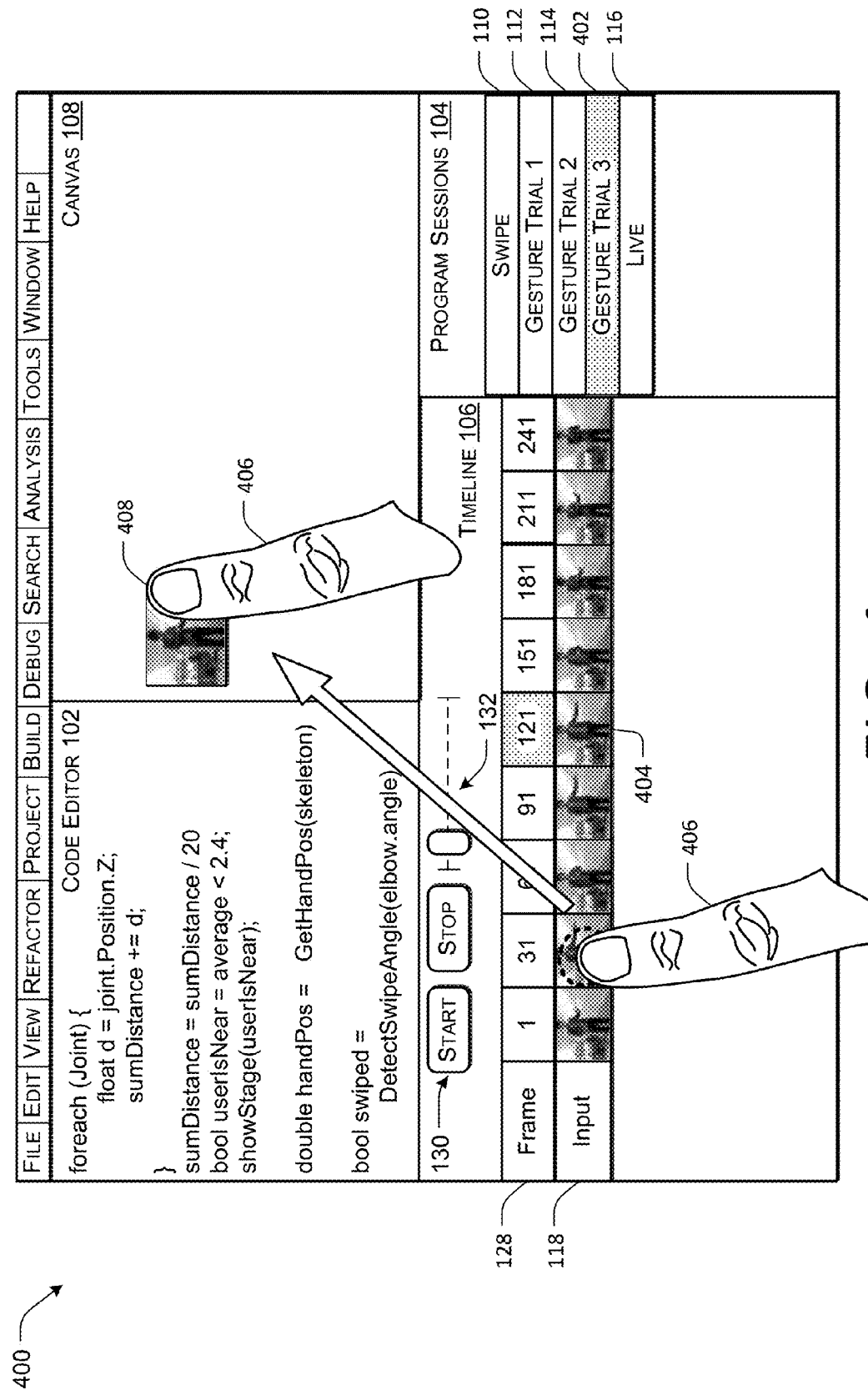
FIG. 4 is another illustrative example of a programming interface for developing camera-based applications according to some implementations.

FIG. 4 is another illustrative example of a programming interface 400 for developing camera-based applications according to some implementations. The program interface 400 includes the code editor 102, the program sessions interface 104, the timeline 106 and the canvas 108 as described above with respect to FIG. 1-3. The program sessions interface 104 is illustrated as presenting the program sessions 110, 112, 114 and 116 to the programmer for selection and viewing using the timeline 106 and the canvas 108 as described above but has an additional program session 402 either added due to an update of the source code or due to the programmer causing the application to process a live camera input. The timeline 106 is displaying only data stream 118 in the illustrated example, for instance, because the programmer is only interested in the camera-based input data at this time. The timeline 106 also includes controls, generally indicated by 130 and 132, which allow the programmer to start execution, stop execution and/or control the speed of execution.

In the illustrated example, the programmer has completed processing the camera-based input data associated with program session 112 (which was shown as executing in FIGS. 1-3) and the program interface 400 has generated a program session 402, "Gesture Trial 3," which the programmer is currently viewing at "frame number 121" indicated by highlight 404. The programmer, having already added the data stream 118 to the timeline 106, is now selecting the data stream 118 to add the camera-based input variable to the canvas 108.

As illustrated, the programmer is using an index finger 406 to interface with a touch screen implementation of programming interface 400. However, the finger 406 may be any object configured to operate a touch screen device, such as a stylus. In some implementations, a mouse or other type of input device may be utilized in lieu of the finger 406 when the programming interface 400 is presented on a non-touch enabled display.

The programmer selects the data stream 118 at "frame number 31" and drops the selected frame onto the canvas 108 to generate instance 408. However, the canvas 108 displays the current value, as indicated by the highlight 404. Thus, as illustrated, the value (i.e., the image) presented in the instance 408 corresponds to the image of data stream 118 at the current frame of interest, rather than the value at position where the programmer selected the data stream (i.e., frame "31"). In some implementations, the programmer may be able to configure the canvas 108 to maintain a record of the frame from which the instance 408 was dragged and to always show the value at that frame, for example, to allow the programmer to compare two variables at different frames and/or to compare the starting value to the current value.

Figure 5:
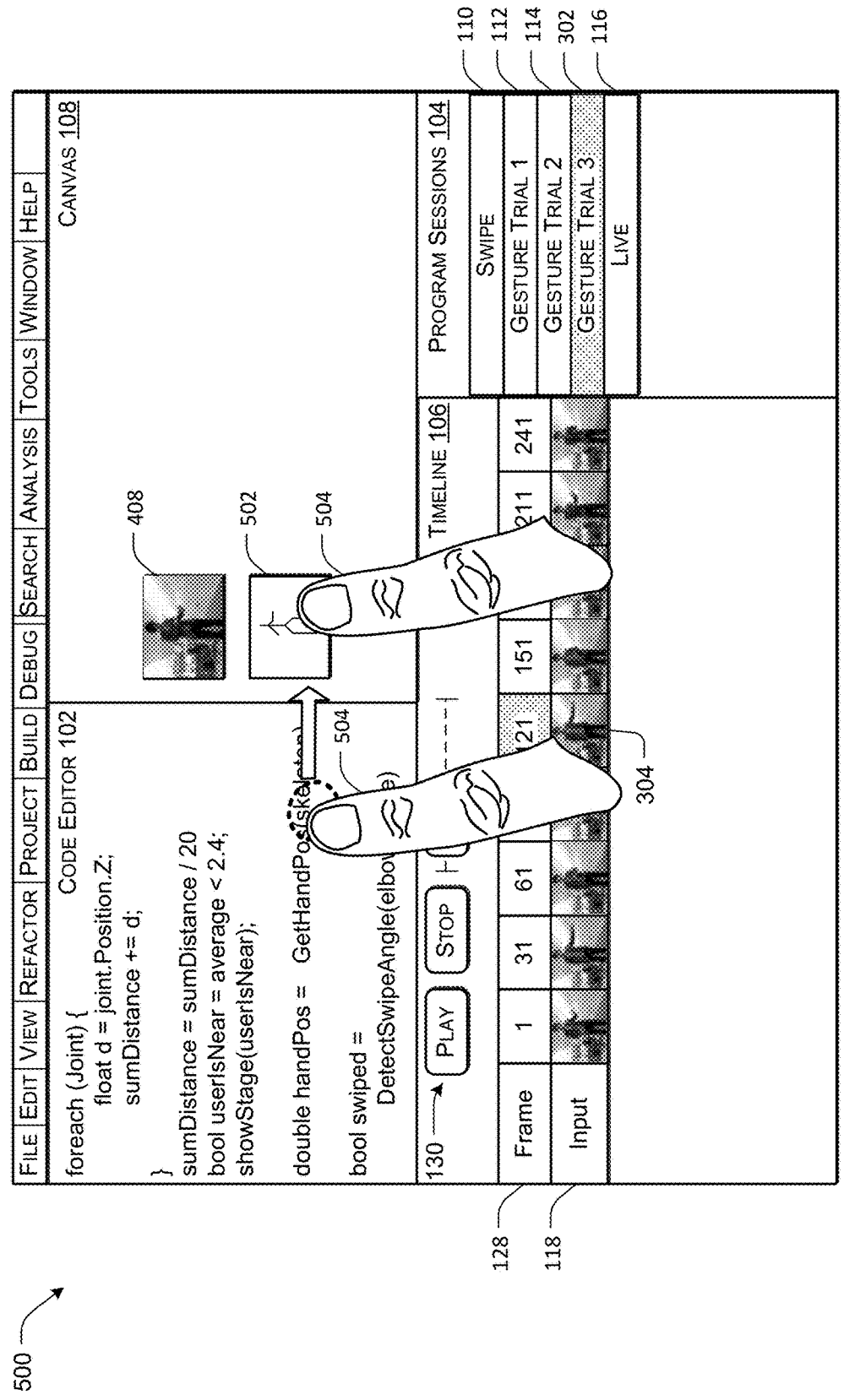
FIG. 5 is another illustrative example of a programming interface for developing camera-based applications according to some implementations.

FIG. 5 is another illustrative example of a programming interface 500 for developing camera-based applications according to some implementations. The program interface 500 includes the code editor 102, the program sessions interface 104, the timeline 106 and the canvas 108 as described above with respect to FIGS. 1-4. The program sessions interface 104 presents the program sessions 110, 112, 114, 402 and 116 to the programmer for selection and viewing using the timeline 106 and the canvas 108 as described above with respect to FIG. 4. The timeline 106 is illustrated as displaying data stream 118 and includes frame indicator 128. The timeline 106 also includes controls, generally indicated by 130, which allow the programmer to start execution, stop execution and/or control the speed of execution.

In the illustrated example, the programmer has added instance 408 to the canvas 108, as described with respect to FIG. 4, and now desires to add an instance 502 related to the variable "skeleton," which is currently visible in the code editor 102. As illustrated, the programmer uses an index finger 504 to select the variable "skeleton" in the code editor 102 by tapping the text "skeleton" and dragging the selected variable to a desired location within the canvas 108.

The programmer may drop the variable "skeleton" at any location within the canvas 108 and/or freely reposition the instance 502 within the canvas 108 after dropping the variable into the canvas 108. For example, the programmer may wish to rearrange instances 408 and 502 after having added both instances 408 and 502 to the canvas 108.

In one particular implementation, the programmer may be able to drag and drop two variables one atop the other into the canvas 108 to generate an instance that represents a combination of the two variables. For example, if both variables were integers the instance may be a summation of the values. In another example, dragging and dropping two variables one atop the other in the canvas 108 may cause the top instance to become semi-transparent, such that the programmer may view both variables simultaneously. For example, the programmer may want to compare how close two images are to each other, such as to when determining variation between two swiping gestures.

Figure 6:
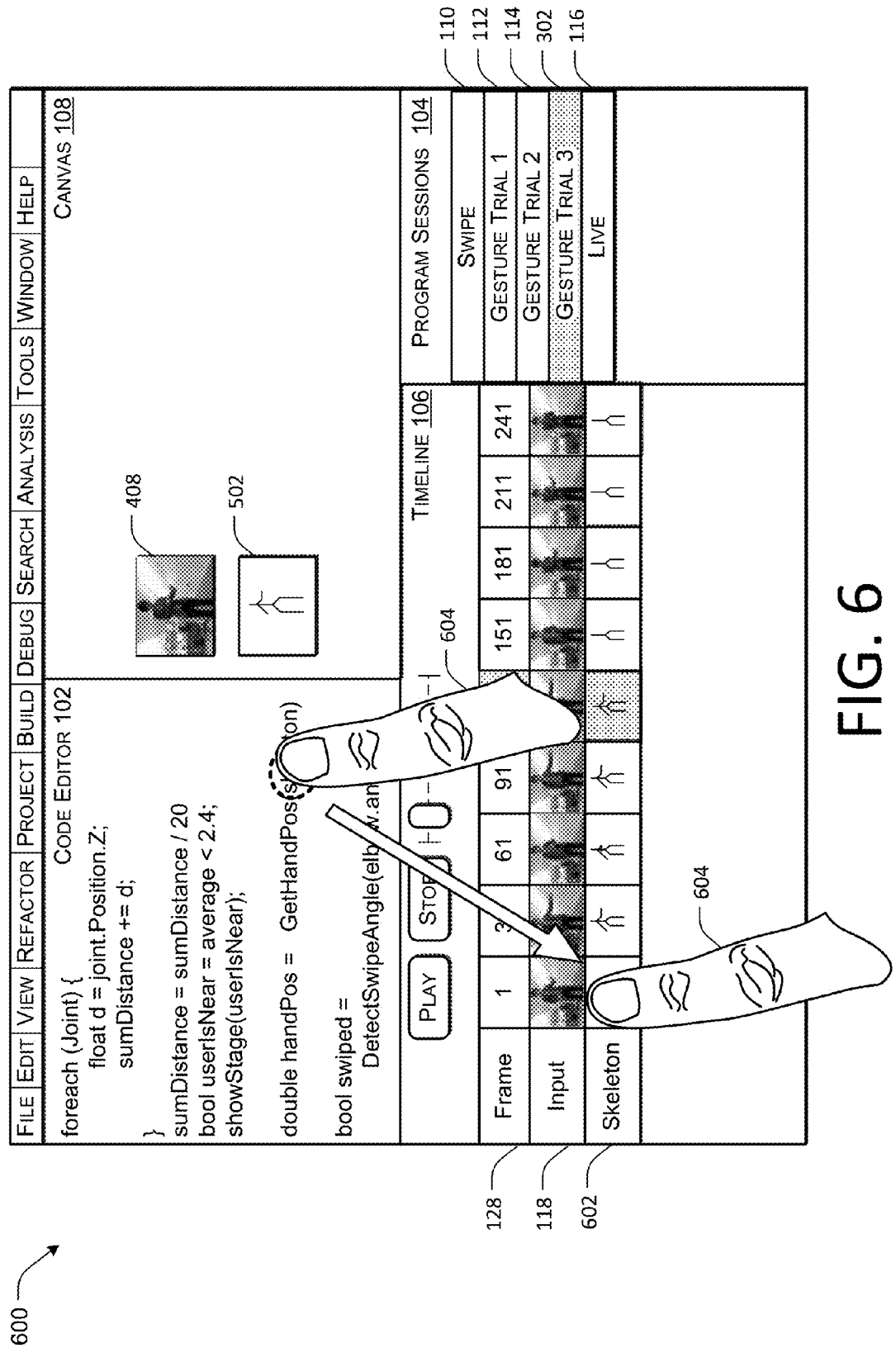
FIG. 6 is another illustrative example of a programming interface for developing camera-based applications according to some implementations.

FIG. 6 is another illustrative example of a programming interface 600 for developing camera-based applications according to some implementations. The program interface 600 includes the code editor 102, the program sessions interface 104, the timeline 106 and the canvas 108 as described above with respect to FIGS. 1-5. The program sessions interface 104 presents the program sessions 110, 112, 114, 402 and 116 to the programmer for selection and viewing using the timeline 106 and the canvas 108 as described above with respect to FIG. 4. The timeline 106 is illustrated as displaying data stream 118 and includes frame indicator 128. The canvas 108 is illustrated as presenting instances 408 and 502 as described in FIG. 5.

In the illustrated example, the programmer is adding a data stream 602 to the timeline 106 related to the variable "skeleton." As illustrated, the programmer uses an index finger 604 to select the variable "skeleton" in the code editor 102 and to drag the variable "skeleton" into the timeline 106. The programmer may drop the variable "skeleton" at any location within the timeline 106 to add the corresponding data stream 602.

In some implementations, the programmer may also reorder the data streams within the timeline 106. For example, the programmer may wish to move data stream 118 to the bottom of the list because the programmer is less concerned with viewing the camera-based input than the values of the application variables. In other instances, the programmer may configure the data streams in the timeline 106 to correspond to the instances shown in the canvas 108 to allow the programmer to more easily monitor changing program data.

Figure 7:
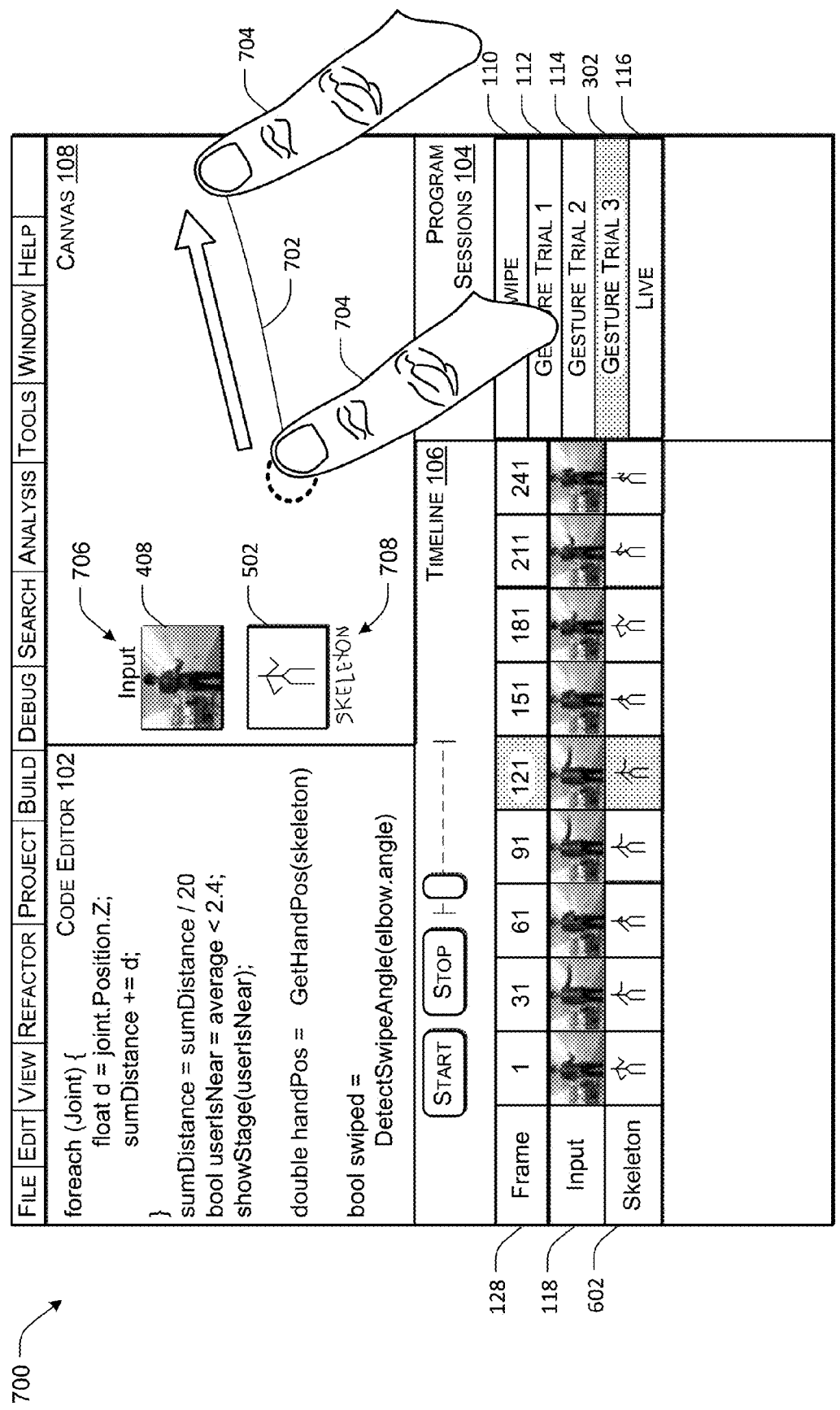
FIG. 7 is another illustrative example of a programming interface for developing camera-based applications according to some implementations.

FIG. 7 is another illustrative example of a programming interface 700 for developing camera-based applications according to some implementations. The program interface 700 includes the code editor 102, the program sessions interface 104, the timeline 106 and the canvas 108 as described above with respect to FIGS. 1-6. The program sessions interface 104 presents the program sessions 110, 112, 114, 402 and 116 to the programmer for selection and viewing using the timeline 106 and the canvas 108 as described above with respect to FIG. 4. The timeline 106 is illustrated as displaying data streams 118 and 602 and includes frame indicator 128 as described above with respect to FIG. 6. The canvas 108 is illustrated as presenting instances 408 and 502 as described in FIGS. 5 and 6.

In this example, the programmer has added data stream 602 to the timeline 106 and is now beginning to annotate the canvas 108 with hand-drawn notes. As illustrated, the programmer is drawing a line 702 by tracing a stroke using an index finger 704 within the canvas 108. The programmer may also add text to the canvas 108. For example, the programmer may add labels to the instances 408 and 502 by adding the text "Input," generally indicated by 706, and "Skeleton," generally indicated by 708.

In some implementations, the programmer may add machine generated text, for example, by adding a text box, such as in the case of the text "Input" 706. In other implementations, the programmer may trace letter and/or numbers on the canvas 108 to provide textual information, such as in the case of the text "Skeleton" 708. In one particular implementation, the programming interface 700 may be configured to convert strokes traced in the shape of letters and/or numbers on the canvas 108 into machine text. Thus, the programmer is able to add visual or pictographic information to the canvas, in addition to the instances, to better visualize or interrupt application data.

Figure 8:
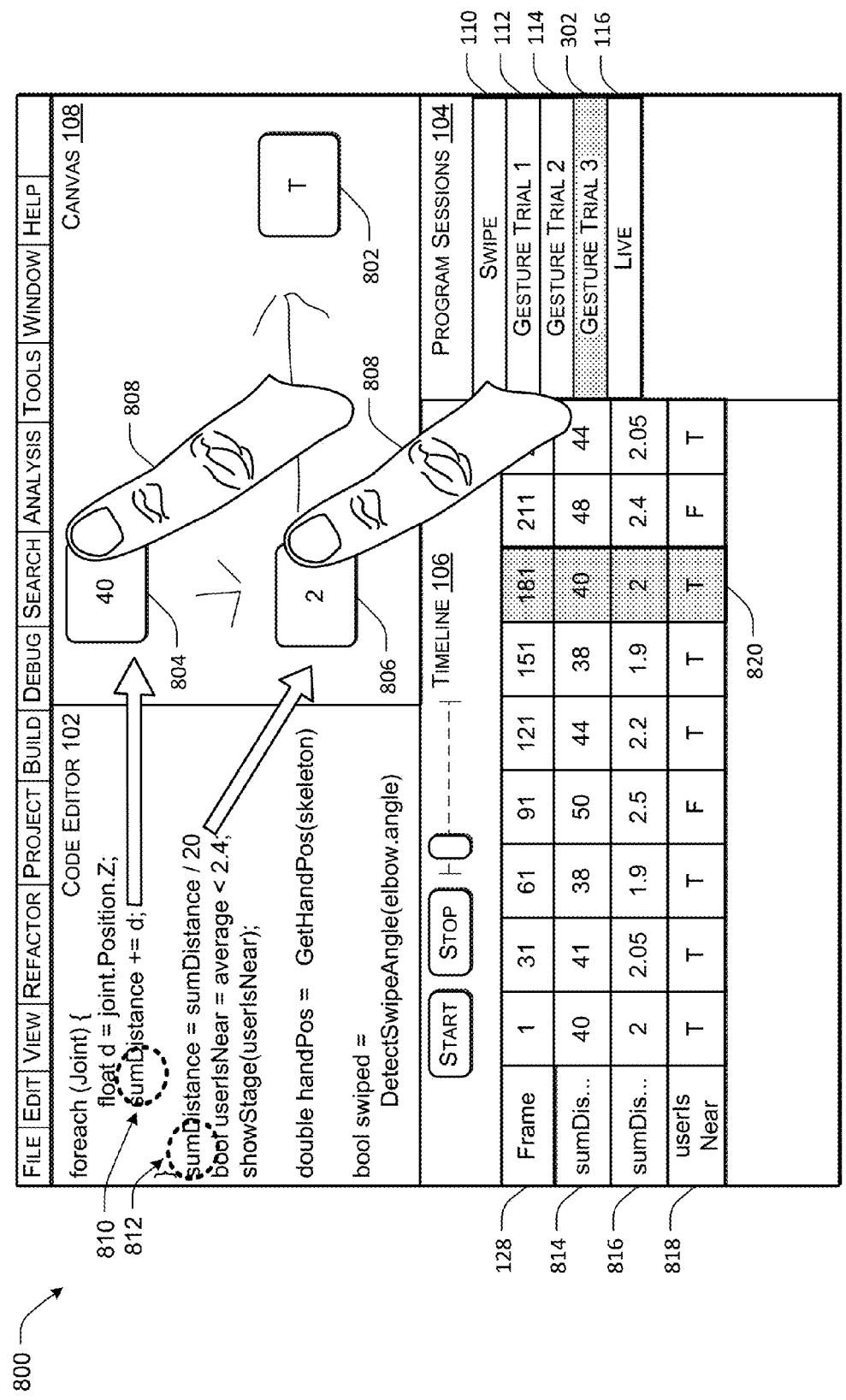
FIG. 8 is another illustrative example of a programming interface for developing camera-based applications according to some implementations.

FIG. 8 is another illustrative example of a programming interface 800 for developing camera-based applications according to some implementations. The program interface 800 includes the code editor 102, the program sessions interface 104, the timeline 106 and the canvas 108 as described above with respect to FIGS. 1-7. The program sessions interface 104 presents the program sessions 110, 112, 114, 402 and 116 to the programmer for selection and viewing using the timeline 106 and the canvas 108 as described above with respect to FIG. 4.

In the illustrative example, the programmer has added the instance 802 corresponding to the variable "userIsNear" to the canvas 108 and is now adding an additional two instances 804 and 806, corresponding to the same variable "sumDistance," to the canvas 108. For example, the programmer may select the variable "sumDistance" using finger 808 from a first location, generally indicated by 810, and drop the variable indicated by 810 into the canvas 108, as instance 804 and then select the same variable "sumDistance" using the finger 808 from a second location, generally indicated by 812, and drop the variable indicated by 812 into the canvas 108, as instance 806.

Instances 804 and 806 are configured to maintain a record of the exact position of where each instance was dragged from within the code editor 102 and to show the value just after the execution of the code at that position. Thus, the values of instances 804 and 806 are different even though both instances 804 and 806 represent the same variable "sumDistance." As illustrated, the value of instance 804 is "40" while the value of instance 806 is "2." For example, after the code "sumDistance=+d;" executes the value of "sumDistance" is "40," as is represented by instance 804, and after the code "sumDistance=sumDistance/20;" executes the value of "sumDistance" is "2," as is represented by instance 806. In this way, the programmer is able to view multiple values of the same variable as the application processes a single frame.

In some implementations, when the programmer adds a variable to the canvas 108, the programming interface 800 also adds a data stream corresponding to the same variable to timeline 106. For example, the data streams 814, 816 and 818 shown in the timeline 106 may correspond to the instances 804, 806 and 802 shown in the canvas 108. In some cases, the data streams of the timeline 106 may also be configured to maintain a record of the exact position of where each corresponding instance was dragged from within the code editor 102 and to show the value just after the execution of the code at that position, such that the data streams show the same values as the corresponding instance. For example, the data stream 814, at the highlight 820, shows a value of "40," which corresponds to instance 804, and the data stream 816 shows a value of "2," which corresponds to the instance 806.

Figure 9:
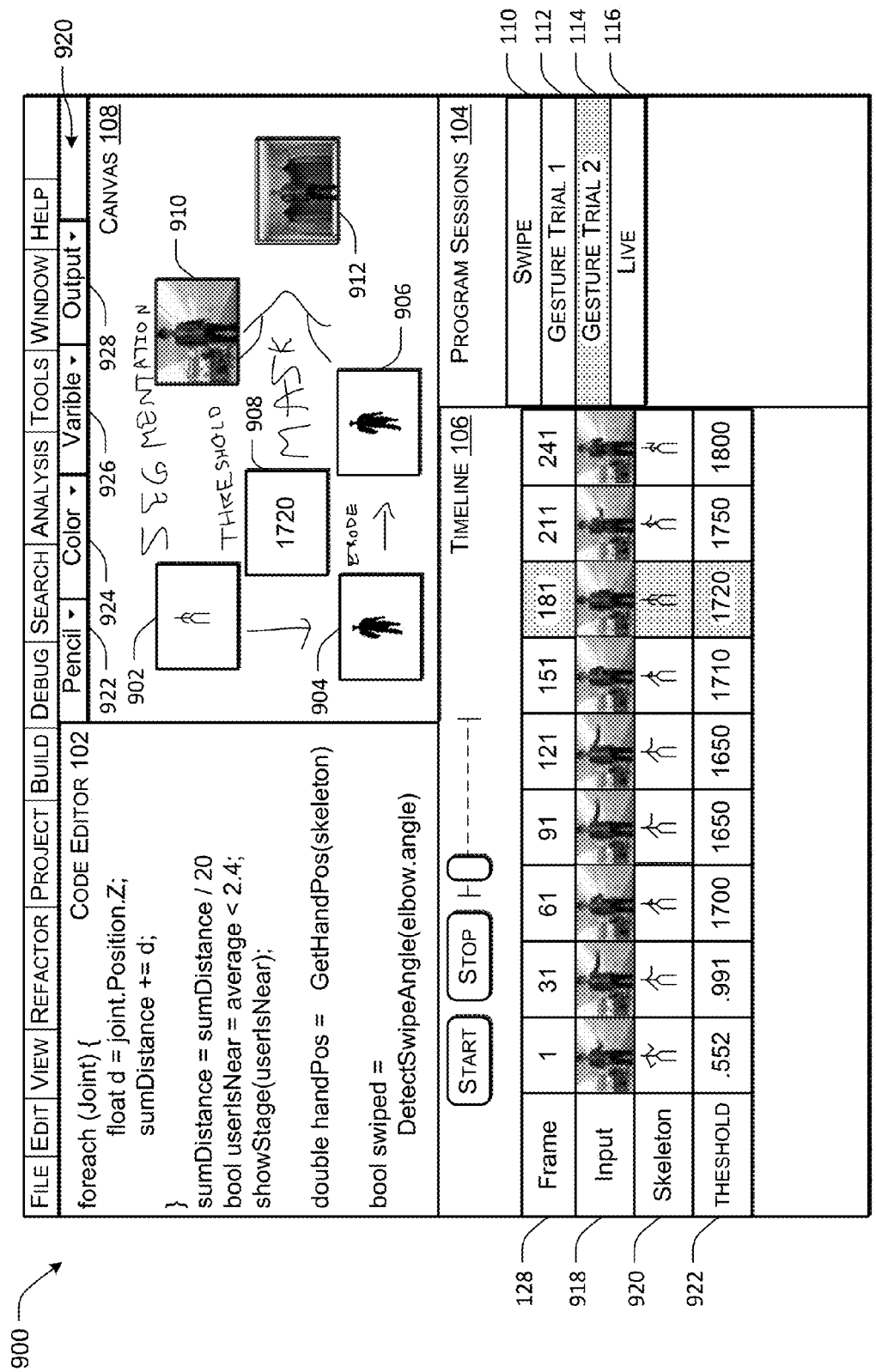
FIG. 9 is another illustrative example of a programming interface for developing camera-based applications according to some implementations.

FIG. 9 is another illustrative example of a programming interface 900 for developing camera-based applications according to some implementations. The program interface 900 includes the code editor 102, the program sessions interface 104, the timeline 106 and the canvas 108 as described above with respect to FIGS. 1-8. In the illustrative example, the programmer is debugging a segmentation module of the camera-based application by reviewing the program sessions 114, "Gesture Trial 2." In this example, the programmer has added an instance 902 corresponding to the variable "skeleton," instance 904 corresponding to a filtered version of the variable "skeleton," instance 906 corresponding to an eroded version of the variable "skeleton," instance 908 corresponding to the variable "threshold," instance 910 corresponding to the input and an instance 912 corresponding to the output of the application to the canvas 108. The program sessions interface 104 presents the program sessions 110-116 to the programmer for selection and viewing using the timeline 106 and the canvas 108 as described above with respect to FIG. 1. The timeline 106 is presenting three data streams 914, 916 and 918 respectively corresponding to the input, the variable "skeleton" and the variable "threshold."

In the illustrated example, the programmer has arranged the instances 902-912, such that the programmer is able to watch the processing of the input image through several filtering steps and finally as the output image displayed on to a user interacting with the application. As illustrated, the input image is processed into a "skeleton" variable, which is utilized to determine the depth of the user by locating the farthest joint. Then using a threshold value and the depth a binary mask is generated. The binary mask is eroded to remove excessive pixels. The mask is then applied to the input image to segment the user from the surrounding environment. A background, such as the stage, may then be applied to the segmented image of the user, in addition, to other operations, such as adding clothing.

In illustrated implementation, the canvas 108 includes editing control options, generally indicated by 920. The controls 920, generally, include image editing tools for providing annotations to the canvas. For instance, in the illustrated example, a drawing tool selector 922 and a color selector 924 are presented to the programmer. The controls 920 may also include a variable selector 926 and an output selector 928. The variable selector 926 allows the programmer to select variables from the application and to insert them directly into the canvas 108 as an instance. For example, the application may include any number of variables, which are not displayed in either the code editor 102 or the timeline 106. Thus, by including a variable selector 926 the programmer may add a variable to the canvas 108 without knowing the variables exact position in the source code. In one particular example, the variable selector 926 may include a series of check boxes, which the programmer may check to add the variable as an instance to the canvas 108. The output selector 928 allows the programmer to quickly add an instance, such as instance 912, corresponding to the output image to the canvas 108.

Figure 10:
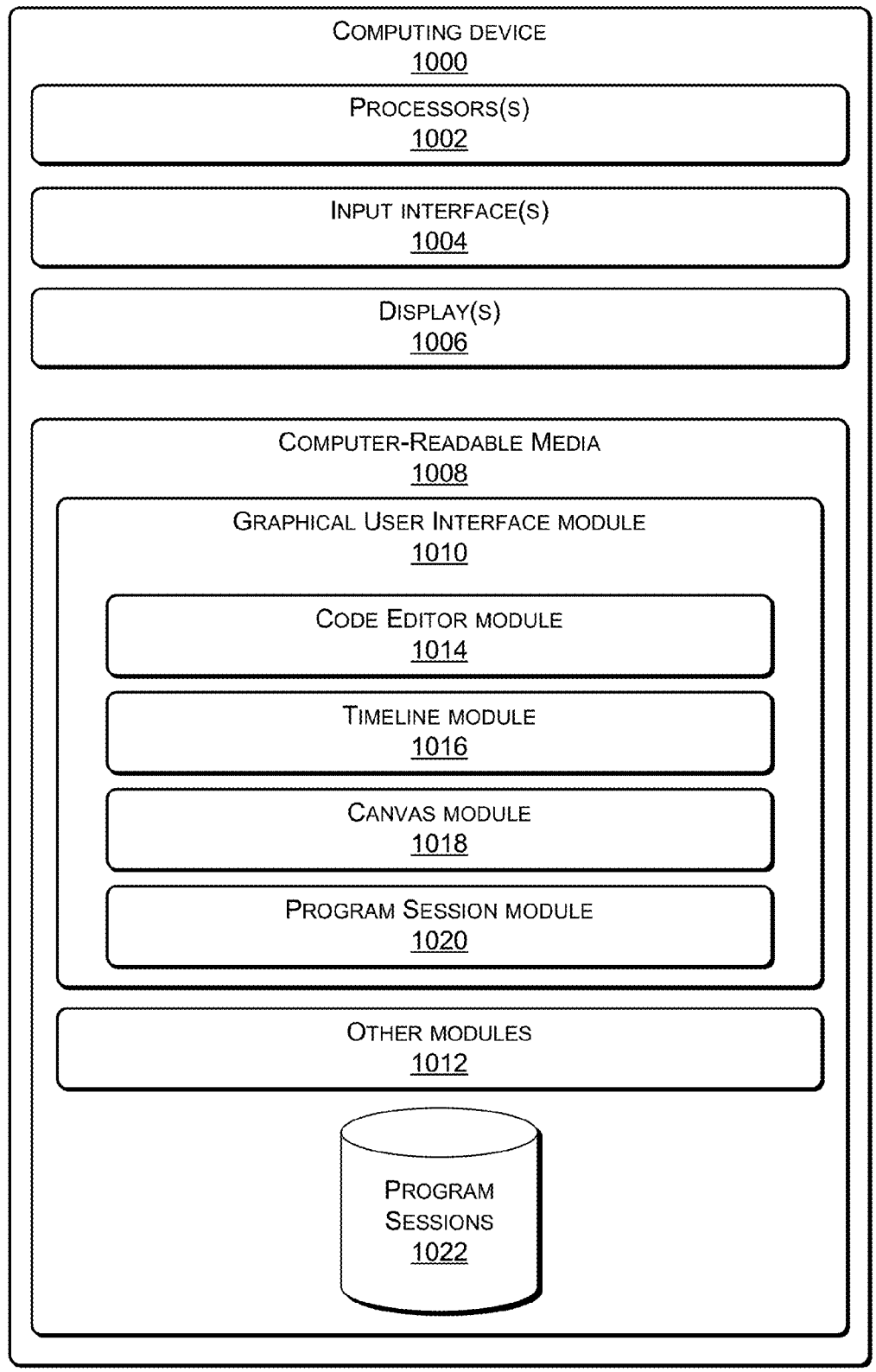
FIG. 10 is a block diagram of an example framework of a computing device according to some implementations.

FIG. 10 is a block diagram of an example framework of a computing device 1000 according to some implementations. In the illustrated example, the computing device 1000 includes, or accesses, components such as one or more processors 1002, one or more input interfaces 1004 and one or more displays 1006, in addition to various other components. In some examples, the processors 1002 may be one or more control logic circuits, central processing units, processing cores or general purpose processors. The processors 1002 are configured to access one or more computer-readable media 1008 to perform the function of the computing device 1000.

As used herein, "computer-readable media" includes computer storage media and communication media. Computer storage media includes volatile and non-volatile, removable and non-removable media implemented in any method or technology for storage of information, such as computer-readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other tangible medium that can be used to store information for access by a computing device.

In contrast, communication media may embody computer-readable instructions, data structures, program modules, or other data in a modulated data signal, such as a carrier wave. As defined herein, computer storage media does not include communication media.

Several modules such as instruction, data stores, and so forth may be stored within the computer-readable media 1008 and configured to execute on the processors 1002, such as a graphical user interface (GUI) module 1010, in addition to, various other modules 1012 may also be stored on computer-readable storage media 1008, such as an operating module. The GUI module 1010 includes a code editor module 1014, a timeline module 1016, a canvas module 1018 and a program session module 1020 for generating a programming interface (e.g., programming interfaces 100-900). In some implementations, the computer-readable media 1008 may also store one or more program sessions 1022 (such as program sessions 110-116 of FIG. 1). The program sessions 1022 may include one or more camera-based inputs, which may be presented to a programmer by the program session module 1020 for use in executing and debugging camera-based applications.

The input interfaces 1004 are configured to receive user inputs from the programmer, such as selections of variables within the code editor window. For example, the user interfaces 1004 may include one or more components, such as keyboards, keypads, joysticks, a mouse, or control buttons. In one particular implementation, the input interfaces 1004 may be combined with the displays 1006 as one or more touch screens to enable a programmer to drag and drop variables and add annotations by tracing strokes.

In one example, the processors 1002 execute the GUI module 1010, which cause the computing device 1000 to present a programming interface on the display 1006. The programming interface including at least one of a code editor to provide a source code editing interface from which the programmer may edit the application and/or view the source code directly generated according to the code editor module 1014, a timeline to present application data associated with a particular program sessions to the programmer in a frame by frame fashion generated according to the timeline module 1016, a canvas to provide an interactive interface that allows the programmer to continuously monitor and annotate any number of variables during runtime in an arbitrary visual layout generated by the canvas module 1018 and a program session interface to present the programmer with a list of program sessions 1022 stored in the computer-readable media 908.

Figure 11:
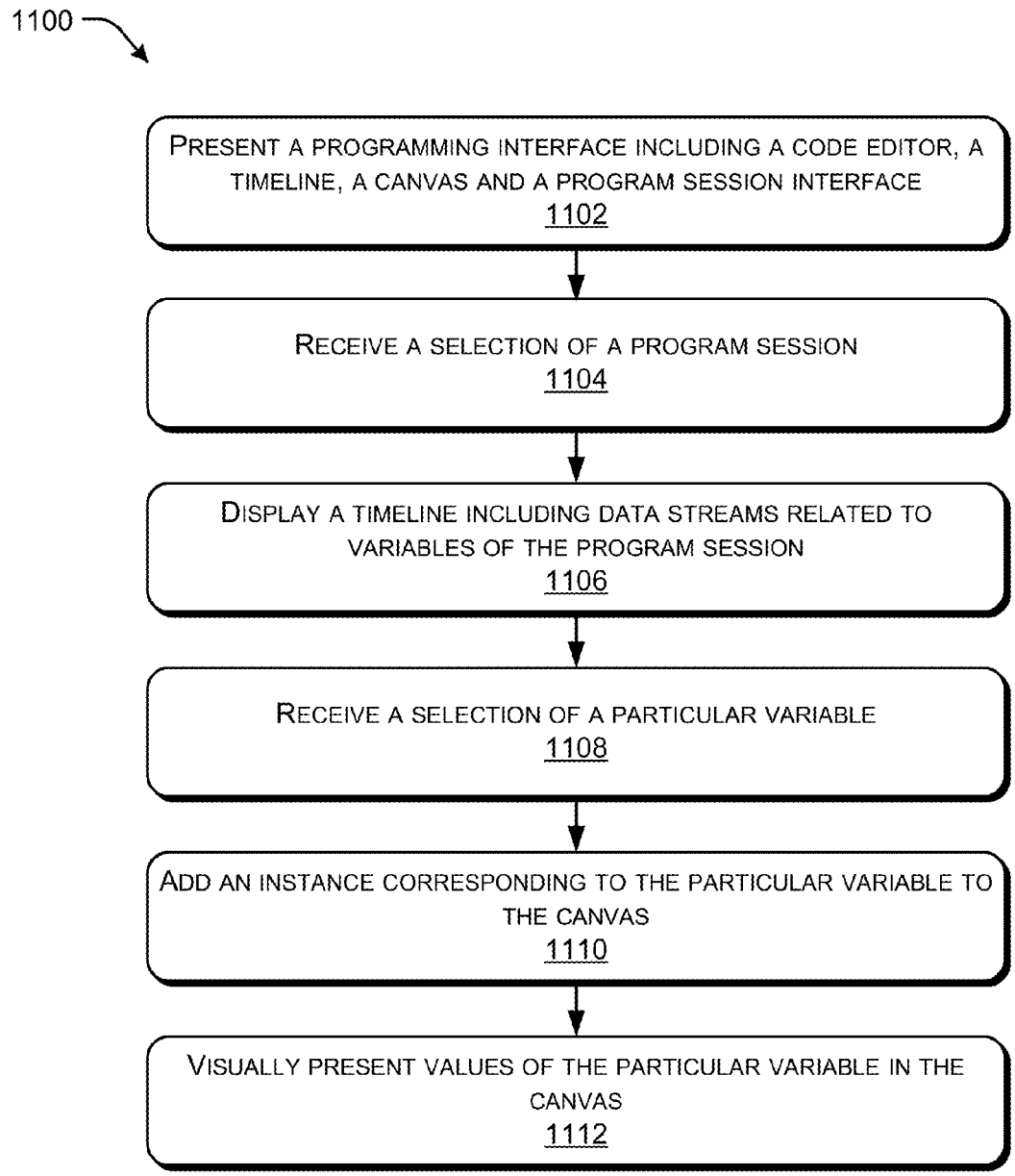
FIG. 11 is an example flow diagram showing an illustrative process for providing a programming interface to develop camera-based applications according to some implementations.

FIG. 11 is flow diagrams illustrating example processes providing an interface for developing camera-based applications. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 11 is an example flow diagram showing an illustrative process 1100 for providing a programming interface to develop camera-based applications according to some implementations. The programming interface may be presented on a standard computing system or on a touch screen enabled computing device. At 1102, the computing device presents a programming interface including a code editor, a timeline, a canvas and a program session interface to a programmer Generally, the code editor is a source code editing interface from which the programmer may edit the application and/or view the code directly. The timeline is a linear interface that presents application data associated with a particular program sessions in a frame by frame manner. The canvas is an interactive interface that allows the programmer to continuously view, interact, arrange and/or annotate any number of variables in an arbitrary visual layout. The program session interface is a list of recorded program sessions.

At 1104, the computing device receives a selection of a program session. For example, during the debugging process, the programmer may select a prerecorded program session with saved programmed data in order to review test results. In another example, the programmer may select a prerecorded program session to rerun a particular camera-based input through the application. In yet another example, the programmer may select a new program session to run the application using a live camera-based input.

At 1106, the computing device displays the timeline including data streams related to variables of the program session. For example, if the programmer selected a prerecorded program session, the timeline displays data streams including values for the corresponding variables captured during a previous runtime.

At 1108, the computing device receives a selection of a particular variable. For example, the programmer may select the variable directly from within the code editor, in which case the programming interface maintains a record of the exact position in the source code where the variable was selected. In other examples, the programmer may choose the variable by selecting a data stream in the timeline corresponding to the particular variable.

At 1110, the computing device adds an instance corresponding to the particular variable to the canvas. For example, the programmer may add instances to the canvas to view values, provide annotations or to logically arrange the instances to better visualize the application data. In some cases, the programmer may add multiple instances of the same variable to monitor changes in the value of the variable during the processing of a single frame.

At 1112, the computing device visually presents values of the particular variable in the canvas. For example, the programmer may execute the application and view, monitor or tack changes to the particular variable represented by the instance in a visual or pictographic format, such as images, numerical values, arrays, etc. The programmer may also add annotations or comments to the canvas.

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A computing device comprising:
one or more displays;
one or more processors; and
a computer-readable storage media storing instructions, which when executed by the one or more processors, cause the one or more processors to present a graphical user interface (GUI) on the one or more displays, the GUI comprising:
a code editor interface to present, for editing, source code associated with a camera-based application;
a timeline to present, on a frame by frame basis, application data associated with a program session for the camera-based application;
a canvas including an interactive interface for dragging one or more portions of the application data, presented in a pictographic format, to one or more recorded positions within the canvas to allow viewing, interacting with, arranging and annotating the application data based at least in part on a user input; and
a program session interface to allow user selection of at least one of a historical program session or a live program session.

2. The computing device of claim 1, wherein the GUI is further configured, in response to receiving user selection of a variable in the code editor interface, to display an instance of the variable in the canvas.

3. The computing device of claim 1, wherein the GUI is further configured, in response to receiving a user selection of a variable in the code editor interface, to display a data stream associated with the variable in the timeline.

4. The computing device of claim 1, wherein the GUI further comprises a user selectable option to execute the camera-based application using one or more recorded camera-based inputs associated with the historical program session.

5. A computer-readable storage media storing instructions, which when executed by one or more processors, cause the one or more processors to present a graphical user interface (GUI), the GUI comprising:
a code editor interface to present, for editing, source code associated with a camera-based application; and
a timeline to present one or more data streams associated with a program session, each of the one or more data streams presenting values of an associated variable, each of the values corresponding to a value of the variable after each frame of a camera-based input is processed;
a canvas including an interactive interface for dragging one or more variables of the camera-based application, presented in a pictographic format, to a recorded position within the canvas to allow viewing, interacting with, arranging and annotating the variables based at least in part on a user input.

6. The computer-readable storage media of claim 5, further comprising instructions, which when executed by the one or more processors cause the GUI to:
receive a selection of a data stream displayed in the time line; and
add the data stream to the canvas as an instance of a variable associated with the data stream, in response to receiving the selection.

7. The computer-readable storage media of claim 5, further comprising instructions, which when executed by the one or more processors cause the GUI to:
receive a selection of an instance displayed in the canvas; and
add the instance to the timeline as a data stream of the variable associated with the instance, in response to receiving the selection.

8. The computer-readable storage media of claim 5, wherein the GUI further comprises a program session interface to allow user selection of at least one of a historical program session or a live program session.

9. The computer-readable storage media of claim 5, wherein the timeline includes a frame indicator to indicate a current frame of interest.

10. The computer-readable storage media of claim 5, wherein the program session is a live program session.

11. The computer-readable storage media of claim 5, wherein the program session is a historical program session.

12. The computer-readable storage media of claim 11, wherein the timeline includes a user selectable option to replay the historical program session.

13. The computer-readable storage media of claim 11, wherein application data associated with the historical program session is updated as a background operation in response to receiving edits to the source code.

14. A method comprising:
presenting, by one or more processors configured with executable instructions, a first interface, the first interface including a first area to display source code;
presenting a second interface concurrently with the first interface, the second interface including a second area to display, in a pictographic format, one or more instances of variables related to a program session; and
based at least in part on a user input, selecting a first variable displayed within the first area and positioning an instance of the first variable at a recorded position, selected by the user, within the second area to allow viewing, interacting with, arranging and annotating the first variable.

15. The method of claim 14, further comprising:
presenting a third interface concurrently with the first interface and the second interface, the third interface including a third area to display, in a pictographic format, one or more data streams of variables related to a program session.

16. The method of claim 14, further comprising:
receiving user inputs within the second area; and
displaying, in response to receiving the user inputs, annotations in the second area corresponding to the user inputs.

17. The method of claim 16, further comprising converting the annotations into machine generated text.

18. The method of claim 14, further comprising:
receiving a second user input selecting a second variable displayed within the first area;
subsequently, receiving a second user selection of a second recorded position within the second area; and
converting the instance of the first variable into a composite instance of the first variable and the second variable.

* * * * *